(No Model.)
T. C. DU PONT.
CAR TRUCK.
No. 567,864. Patented Sept. 15, 1896.
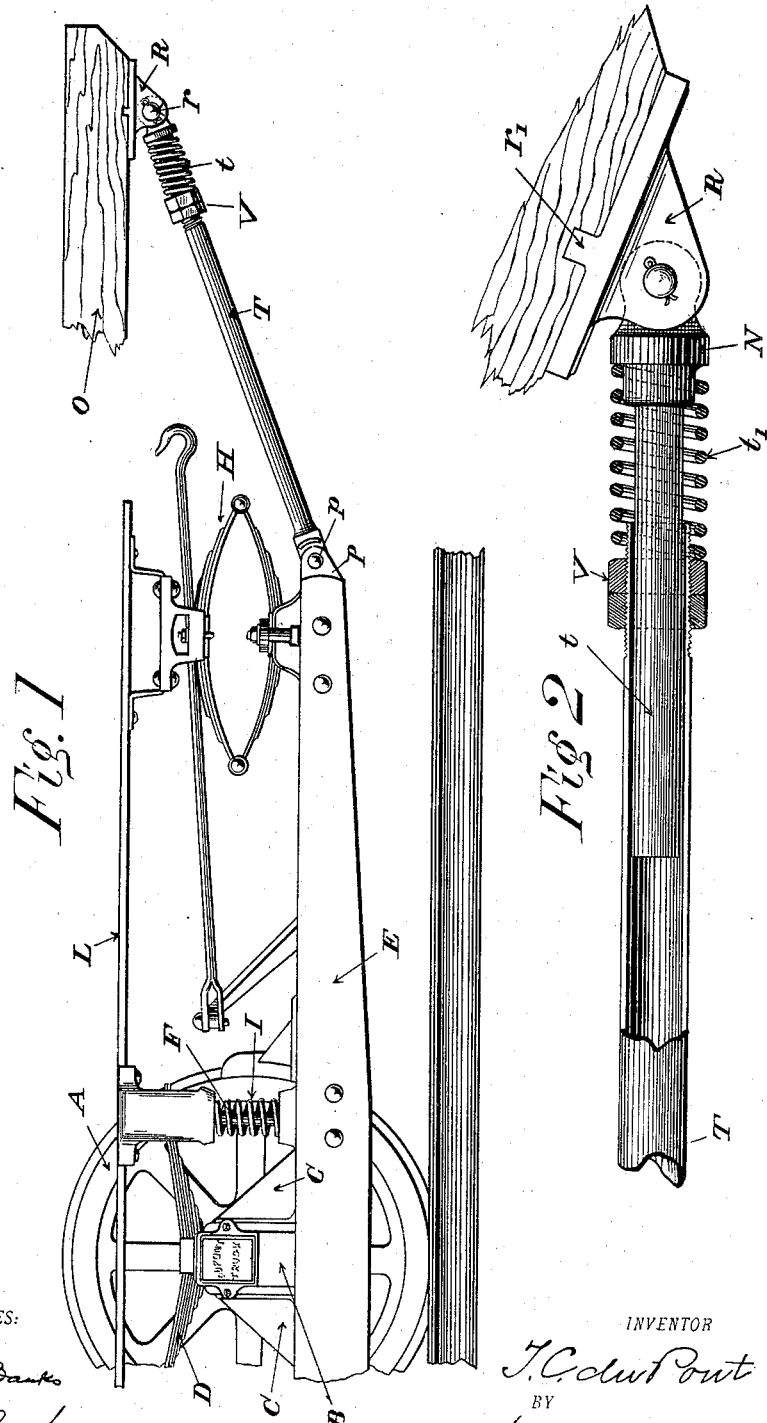

UNITED STATES PATENT OFFICE.

THOMAS COLEMAN DU PONT, OF JOHNSTOWN, PENNSYLVANIA.

CAR-TRUCK.

SPECIFICATION forming part of Letters Patent No. 567,864, dated September 15, 1896.

Application filed June 2, 1896. Serial No. 594,022. (No model.)

*To all whom it may concern:*

Be it known that I, THOMAS COLEMAN DU PONT, of Johnstown, county of Cambria, State of Pennsylvania, have invented certain new and useful Improvements in Car-Trucks, of which the following specification is a true and exact description, due reference being had to the accompanying drawings.

My invention relates to certain improvements in car-trucks for street-railways. In these trucks the wheel-base is, comparatively speaking, very short, the car-body greatly overhanging on each end. Especially is this so in the case of the long open summer cars. With these cars considerable difficulty is experienced in the cars oscillating or rocking in the direction of their length.

The object of my invention is to provide in a truck means for preventing this oscillating, and thus causing the truck to ride steadier and more quietly than it otherwise would.

Referring to the drawings, Figure 1 represents a side view of a portion of a truck embodying my invention. Fig. 2 is an enlarged view, partly in section, of a certain portion of the truck.

A is one of the wheels of the truck.

B is the journal-box, slidable vertically between the guides C and carrying the spring D. This spring D carries the side bar E of the truck by means of bolts F. This side bar E carries the several springs H and I, upon which is the sill-plate L. Upon this sill-plate L rests the sill O of the car-body. This spring H has heretofore been the limit of the spring-base. I am aware that the outer ends of the cars have been trussed by inclined rods, but these have been independent of the springs and were in no way a remedy for the trouble.

In a truck constructed in accordance with my invention I provide on the extremity of the side bar E the member P, having a pivot-hole $p$, and near the extremity of the sill O, I place a similar thrust-block R, having a pin $r$. Between these two pins I place the thrust-rod T. The construction of this is clearly shown in Fig. 2. The rod T is formed with a suitable pivot-hole for pin $p$ at one end and a portion of the other end is hollow. In this bore slides the rod $t$, having one end formed to receive the pin $r$. Encircling rod $t$ is the compression-spring $t'$, compressed between the thrust-block R and nuts V on the rod T. The nuts V being threaded on rod T, the tension upon the spring may be varied at will. The thrust-block R preferably has the tongue $r'$, which enters the sill O and insures that there be no slipping of the block. It will be seen that as the end of the car goes down it will shorten the distance between the pins $p$ and T and thus compress the spring $t'$, rod $t$ sliding further within rod T. This resistance being applied at the very extremity of the car-sill is very effective in preventing oscillation.

Having thus described my invention, what I claim, and desire to protect by Letters Patent, is—

An extension thrust-rod for street-car trucks, comprising an outer tubular portion, adapted to be pivoted, an inner portion slidable within the first-mentioned member and also adapted to be pivoted, a spring encircling the latter portion and a nut threaded upon the tubular member.

In testimony whereof I have affixed my signature in presence of two witnesses.

THOMAS COLEMAN DU PONT.

Witnesses:
JOHN H. KENNEDY,
D. R. McLAIN.